US007105142B2

(12) United States Patent
Paparatto et al.

(10) Patent No.: US 7,105,142 B2
(45) Date of Patent: Sep. 12, 2006

(54) DIRECT SYNTHESIS OF HYDROGEN PEROXIDE IN A MULTICOMPONENT SOLVENT SYSTEM

(75) Inventors: Giuseppe Paparatto, Cinisello Balsamo-Milan (IT); Giordano De Alberti, Besnate-Varese (IT); Rino D'Aloisio, Novara (IT)

(73) Assignees: Eni S.p.A., Rome (IT); Polimeri Europa S.p.A., Brindisi (IT)

( * ) Notice: Subject to any disclaimer, the term of this patent is extended or adjusted under 35 U.S.C. 154(b) by 106 days.

(21) Appl. No.: 10/477,196

(22) PCT Filed: Apr. 29, 2002

(86) PCT No.: PCT/EP02/04862

§ 371 (c)(1),
(2), (4) Date: Apr. 6, 2004

(87) PCT Pub. No.: WO02/092502

PCT Pub. Date: Nov. 21, 2002

(65) Prior Publication Data

US 2004/0151660 A1 Aug. 5, 2004

(30) Foreign Application Priority Data

May 17, 2001 (IT) .......................... MI2001A1016

(51) Int. Cl.
*C01B 15/029* (2006.01)
(52) U.S. Cl. ..................................... 423/584
(58) Field of Classification Search ................. 423/584
See application file for complete search history.

(56) References Cited

U.S. PATENT DOCUMENTS

| 3,361,533 | A | * | 1/1968 | Hooper ....................... 423/584 |
| 4,335,092 | A | | 6/1982 | Dalton, Jr. et al. |
| 4,336,238 | A | | 6/1982 | Dalton, Jr. et al. |
| 5,783,164 | A | * | 7/1998 | Bianchi et al. ............. 423/584 |
| 5,965,101 | A | * | 10/1999 | Goto et al. ................. 423/584 |
| 6,468,496 | B1 | * | 10/2002 | Jones et al. ................. 423/584 |
| 6,534,661 | B1 | * | 3/2003 | Zhou et al. ................. 549/531 |
| 6,630,118 | B1 | | 10/2003 | Paparatto et al. |
| 2002/0106320 | A1 | * | 8/2002 | Zhou et al. ................. 423/584 |

FOREIGN PATENT DOCUMENTS

| EP | 0 787 681 | 8/1997 |
| EP | 0 978 316 | 2/2000 |
| GP | 1 056 125 | 1/1967 |
| WO | 98 16463 | 4/1998 |

* cited by examiner

*Primary Examiner*—Wayne A. Langel
(74) *Attorney, Agent, or Firm*—Oblon, Spivak, McClelland, Maier & Neustadt, P.C.

(57) ABSTRACT

A process is described for the production of hydrogen peroxide from hydrogen and oxygen in a reaction solvent containing a halogenated promoter and/or an acid promoter, in the presence of a heterogeneous catalyst based on one or more metals of the platinum group, wherein the reaction solvent consists of: (1) an alcohol or mixture of alcohols; (2) an aliphatic ether having general formula (I); and (3) optionally water. The solvent mixture may also contain one or more $C_5$–$C_{32}$ hydrocarbons. The process operates under high safety conditions with a high productivity and molar selectivity towards the formation of $H_2O_2$.

60 Claims, No Drawings

DIRECT SYNTHESIS OF HYDROGEN PEROXIDE IN A MULTICOMPONENT SOLVENT SYSTEM

The present invention relates to a process for the production of hydrogen peroxide ($H_2O_2$) from hydrogen and oxygen which uses as reaction solvent, a mixture consisting of one or more alcohols, an aliphatic ether having general formula (I) and optionally water.

Hydrogen peroxide is a commercially important product which is widely used as a bleach in the textile and paper industry, as biocide in the environmental field and in the chemical industry in oxidation processes.

Examples of these oxidation processes are those using titanium silicalite as catalysts, such as the epoxidation of olefins (EP-100,119), the ammoximation of carbonyl compounds (U.S. Pat. No. 4,794,198), the oxidation of ammonia to hydroxylamine (U.S. Pat. No. 5,320,819) and the hydroxylation of aromatic hydrocarbons (U.S. Pat. No. 4,369,783).

The industrial production of aqueous solutions of $H_2O_2$ by means of a complex two-step process, is known.

In this process a solution of an anthraquinone, such as butylanthraquinone or ethylanthraquinone, in an or ganic medium immiscible with water, is first hydrogenated and then oxidized with air to produce $H_2O_2$ which is subsequently extracted in aqueous phase.

This process, however, has considerable disadvantages deriving from the necessity of operating with large volumes of reagents, the numerous steps required, the relatively high cost of the intermediates and production of inactive by-products.

Processes for the direct synthesis of hydrogen peroxide from $H_2$ and $O_2$ have been studied, to overcome these drawbacks. These processes are generally carried out by reacting the two gases in a solvent consisting of an aqueous medium or an aqueous-organic medium, in the presence of a catalytic system consisting of a noble metal, particularly metals of the platinum group or their mixtures, in the form of salts or as supported metals.

Among processes of this type, those which seem particularly attractive from a technical and economic point of view, operate in an alcohol or alcohol-aqueous medium, for example, in methanol or in methanol-water described, for example, in U.S. Pat. No. 4,335,092, in patent application WO 98/16463, in European patent application EP 787681 and more specifically in European patent application EP 978316 and in Italian patent applications MI 2000 A001218, MI 2000 A001219 and MI 2000 A001881.

In fact, with the other conditions remaining unchanged, higher reaction rates and selectivities are observed with respect to operating in an aqueous medium.

The high reaction performances result, in turn:
i. in the possibility of carrying out the process under high safety conditions, well outside the explosivity zone of $H_2$—$O_2$ mixtures, without jeopardizing the process from a technical-economic point of view;
ii. in the possibility of using extremely low quantities of promoters (halides and acids) in the reaction medium, with beneficial effects on the stability of the catalytic system and on the production of stable hydrogen peroxide solutions, at a concentration suitable for direct use and economically valid in oxidation processes.

Finally, the concentration of the hydrogen peroxide produced, can reach commercially useful values, as the boiling point and the evaporation heat of the alcohol, suitably selected, are lower than those of water.

It has now been found that it is possible to further improve these processes, in terms of selectivity and from an economic point of view, by using, as reaction solvent, a system comprising one or more alcohols, an aliphatic ether and optionally water.

The $H_2O_2$ solutions obtained can be used directly in oxidation processes which use titanium silicalite as catalyst, as the components of the solvent mixture are compatible with said processes.

Furthermore, with the use of this solvent system, the concentration of the hydrogen peroxide produced can reach commercially useful values, as the evaporation heat of the ether, suitably selected, are lower than that of water and alcohol.

In fact, whereas 9717 calories/mole (equal to about 540 calories/g) and 8426 calories/mole (equal to 263.3 calories/g) are respectively necessary for distilling water or, for example, methanol, 7290 calories/mole equal to 82.8 calories/g are necessary for distilling, for example, Methyl-terbutylethyl (MTBE).

In accordance with this, an object of the present invention relates to a process for the production of hydrogen peroxide starting from hydrogen and oxygen, in a reaction solvent containing a halogenated promoter and/or an acid promoter, in the presence of a heterogeneous catalyst based on a metal of the platinum group, wherein the reaction solvent consists of:
(1) an alcohol or mixture of alcohols;
(2) an aliphatic ether; and
(3) optionally water.

Examples of alcohols suitable for the purposes of the present invention are selected from those having from 1 to 6, preferably from 1 to 4, carbon atoms.

Among $C_1$–$C_4$ alcohols, methanol, ethanol, terbutanol (TBA) or their mixtures, are preferred. Methanol is particularly preferred.

The aliphatic ethers are selected from those having general formula (I)

  (I)

wherein R and $R_1$, the same or different, are alkyl groups with from 1 to 6 carbon atoms. In the compounds having formula (I), R is preferably a methyl and $R_1$ a ter-alkyl. Methyl-terbutylether (MTBE) is particularly preferred.

The quantity of alcohol or mixture of alcohols ranges from 10 to 99.9% by weight with respect to the solvent mixture, preferably from 20 to 80% by weight with respect to the reaction solvent.

The quantity of ethers which is used in the reaction is in relation to the type of alcohol(s) adopted and generally ranges from 0.1 to 90% by weight, preferably from 20 to 80% by weight, with respect to the reaction solvent.

The quantity of water, when present, ranges from 0 to 50% by weight with respect to the solvent mixture, preferably from 2 to 30% by weight with respect to the reaction solvent.

According to an embodiment of the process of the present invention, the reaction solvent may also contain one or more $C_5$–$C_{32}$ hydrocarbons.

These hydrocarbons are generally selected from paraffins, cyclo-paraffins or aromatic compounds.

Examples of paraffinic hydrocarbons are preferably selected from those having from 5 to 18, carbon atoms, and can be linear or branched.

Examples of said paraffinic hydrocarbons are n-hexane, n-heptane, n-octane, n-decane or their branched isomers.

Examples of cyclo-paraffinic hydrocarbons are cyclohexane, decaline or their derivatives substituted with one or more alkyl groups having from 1 to 6 carbon atoms. Typical examples of said compounds are methyl-cyclohexane, ethyl-cyclohexane or dimethyl-cyclohexane.

Aromatic hydrocarbons suitable for the purposes of the present invention are preferably selected from those having from 6 to 24 carbon atoms.

Examples of aromatic hydrocarbons are benzene, naphthalene, alkylbenzenes and alkylnaphthalenes with one or more linear or branched alkyl chains, having from 1 to 18, preferably from 6 to 12, carbon atoms. Examples of alkylbenzenes are toluene, xylenes (ortho, meta and para), ethylbenzene and cumene.

The quantity of hydrocarbons which is used in the reaction is in relation to the type of alcohol(s) used, and generally ranges from 0.01 to 40% by weight, preferably from 0.1 to 20% by weight, with respect to the total reaction mixture.

The catalyst which can be used for the purposes of the invention is a heterogeneous catalyst containing one or more metals of the platinum group as active components.

Examples of these metals are palladium, platinum, ruthenium, rhodium, iridium and gold. Preferred metals are palladium and platinum.

The palladium is normally present in these catalysts in a quantity ranging from 0.1 to 5% by weight and the platinum in a quantity ranging from 0.01 to 1% by weight, with an atomic ratio between platinum and palladium ranging from 0.1/99.9 to 50/50.

The palladium is preferably present in a quantity ranging from 0.2 to 3% by weight and the platinum in a quantity ranging from 0.02 to 0.5% by weight, with an atomic ratio between platinum and palladium ranging from 1/99 to 30/70.

In addition to palladium and platinum, other metals such as, for example, ruthenium, rhodium, iridium and gold, can be present as active components or promoters, in a concentration generally not higher than that of the palladium.

The catalyst can be prepared by dispersing the active components on an inert carrier by means of precipitation and/or impregnation starting from precursors consisting, for example, of solutions of their salts or soluble complexes, and therein reduced to the metal state by means of thermal and/or chemical treatment with reducing substances such as hydrogen, sodium formiate, sodium citrate by means of preparative techniques well known in the state of the art.

According to an embodiment of the present invention, the catalyst can be prepared by dispersing in sequence and alternating the precursors of the single metal components of the catalyst on a carrier, as described and claimed in the patent application IT MI2000-A001219.

The inert carrier may typically consist of activated carbon, silica, alumina, silica-alumina, zeolites, and other materials well known in the state of the art. Activated carbon is preferred for the preparation of the catalysts useful for the invention.

Activated carbons which can be used for the invention are selected from those of fossil or natural origin deriving for example from wood, lignite, peat or coconut and having a surface area higher than 100 $m^2/g$, preferably higher than 300 $m^2/g$; a carbon with a surface area higher than 600 $m^2/g$ is particularly preferred. Preferred activated carbons are those with a low ash content.

The sulfonated activated carbons described in European patent application EP 978316 can be used for the purpose.

Before the supporting or impregnation of the metals, the activated carbon can be subjected to treatment such as washing with distilled water or treatment with acids, bases or diluted oxidizing agents, for example acetic acid, hydrochloric acid, sodium carbonate and hydrogen peroxide.

The catalyst is normally dispersed in the reaction medium at a concentration ranging from 0.1 to 10% by weight, preferably from 0.3 to 3% by weight with respect to the reaction solvent.

The acid promoter may be any substance capable of generating $H^+$ hydrogen ions in the reaction solvent and is generally selected from inorganic acids such as sulfuric, phosphoric, nitric acid or from organic acids such as sulfonic acids. Sulfuric acid and phosphoric acid are preferred.

The concentration of the acid generally ranges from 20 to 1000 mg per kg of reaction solvent and preferably from 50 to 500 mg per kg of reaction solvent.

The halogenated promoter can be any substance capable of generating halide ions in the reaction solvent. Substances capable of generating bromide ions are preferred. These substances are generally selected from hydrobromic acid and its salts soluble in the reaction medium, for example sodium bromide, potassium bromide, ammonium bromide or sodium bromate. Hydrobromic acid, sodium bromide and potassium bromide are preferred.

The concentration of the halogenated promoter generally ranges from 0.1 to 50 mg per kg of reaction solvent and preferably from 1 to 10 mg per kg of reaction solvent.

The production of hydrogen peroxide is carried out by reacting oxygen and hydrogen in the reaction solvent in the presence of the catalyst and promoters and in the presence or absence of an inert gas selected from nitrogen, helium, argon. Nitrogen is the preferred gas.

The molar ratio $H_2/O_2$ in the feeding ranges from 1/1 to 1/100, preferably from 1/2 to 1/15 and the concentration of hydrogen in the gaseous phase in contact with the reaction solvent is conveniently maintained at a value lower than 4.5% molar, outside the explosivity limits of the mixture consisting of $H_2$, $O_2$ and, optionally, an inert gas.

According to an embodiment of the process of the present invention, the reaction can be carried out using air instead of pure oxygen.

The reaction is typically carried out at temperatures ranging from $-5°$ to $90°$ C., preferably from 2 to $50°$ C. and at a total pressure higher than atmospheric pressure, preferably ranging from 30 to 300 bars.

The process according to the present invention can be carried out batchwise or, preferably, in continuous using a reactor suitable for the purpose and selected from those described in the state of the art.

Operating under the above conditions, it is possible to produce hydrogen peroxide under safety conditions with a reaction productivity normally ranging from 30 to 200 g of $H_2O_2$ (expressed as $H_2O_2$ at 100%) per litre of reaction medium per hour and with a molar selectivity towards the formation of $H_2O_2$, referring to the hydrogen used up, ranging from 60% to 90%.

The solutions of hydrogen peroxide thus obtained can be used directly in oxidation processes which comprise the use of $H_2O_2$ without complex intermediate processing such as the removal of acids and solvents.

Furthermore, the process of the present invention is suitable for the production of aqueous solutions of $H_2O_2$ for commercial use, by the removal of the organic components from the reaction medium, for example by distillation, which can be recycled to the synthesis.

The process of the present invention allows the reagents to be transformed into $H_2O_2$ with high conversions and selectivities, obtaining $H_2O_2$ solutions without acidity or containing only traces of acidity and/or salts.

The following examples, which have the sole purpose of describing the present invention in greater detail, should in n6 way be considered as limiting its scope.

EXAMPLE 1

Treatment of the Carrier 50 g of activated carbon in maritime pine charcoal in powder form (CECA) and 500 ml of distilled water are charged into a 1 liter glass flask. After 2 hours at 80° C., the activated carbon is filtered and washed with 500 ml of distilled water.

The activated carbon, still damp, is then charged into the 1 liter glass flask and after adding 500 ml of a solution at 2% by weight of HCl, the temperature is brought to 80° C. After about 2 hours, the mixture is cooled and the activated carbon is washed on a filter with distilled $H_2O$ until the chlorides have been eliminated. The washed activated carbon is recovered and dried in an oven at 120° C. for 2 hours.

EXAMPLE 2

Preparation of the Catalyst 1% Pd-0.1% Pt/C 10 g of activated carbon treated as described in example 1, are charged into a 0.5 liter glass flask, containing 100 ml of distilled water and 0.32 g of $Na_2CO_3$. The suspension is maintained at room temperature (20–25° C.), under stirring, for 10 minutes. 10 ml of an aqueous solution containing 1.0 g of a solution of $Na_2PdCl_4$ at 10% by weight of Pd and 0.1 g of a solution of $H_2PtCl_6$ at 10% by weight, are subsequently added dropwise over a period of about 10 minutes.

The suspension is kept at room temperature for 10 minutes and is then heated for 10 minutes to 90° C. A solution containing 0.85 g of sodium formiate in 10 ml of water is then added and the stirring is continued at 90° C. for 2 hours.

After cooling to room temperature, the suspension is filtered and the catalyst recovered is washed with distilled water until the chlorides have been eliminated and dried in an oven at 120° C. for 2 hours.

EXAMPLE 3 (COMPARATIVE)

Synthesis of Hydrogen Peroxide

A micropilot plant is used, consisting of a Hastelloy C autoclave having a volume of 350 ml, equipped with a thermostat-regulation system, a magnetic drag stirring system, a regulation and control system of the pressure during the reaction, a filter for continuously removing the liquid phase containing the reaction products, a feeding system of the mixture of solvent and promoters in which the reaction takes place, a feeding system of the gaseous reagents and a series of regulation and control instruments. 0.6 g of catalyst prepared as described in example 1 and 100 g of methanol:water solution (97/3 by weight) containing 6 ppm of HBr and 200 ppm of $H_2SO_4$ are charged into the reactor.

The autoclave is pressurized, without stirring, at 100 bars with a gaseous mixture consisting of 3.6% of $H_2$, 11% of $O_2$ and 85.4% of $N_2$ by volume. The stirring is then started up to 800 revs/minute, the pressure is maintained with a continuous stream, 700 normal liters (Nl/hour), of the same gaseous mixture, with the contemporaneous feeding of 300 g/hour of a methanol:water solution having the composition defined above and containing 6 ppm of HBr and 200 ppm of $H_2SO_4$.

The temperature inside the reactor is kept at 8° C. The reaction trend is followed by continuously analyzing the hydrogen and oxygen in the feeding and at the outlet of the reactor.

The concentration of $H_2O_2$ which is formed is determined in the reactor liquid effluent by titration with potassium permanganate. The selectivity with respect to the converted hydrogen is calculated on the basis of the concentration of $H_2O_2$ in the reaction effluent and on the basis of analysis of the $H_2$ leaving the reactor, once the stationary state has been reached in the reactor.

The results obtained are indicated in Table 1.

EXAMPLE 4

Example 3 was repeated, feeding to the reactor a liquid mixture consisting of 92% of methanol, 5% of MTBE and 3% of water and containing 6 ppm of HBr and 200 ppm of $H_2SO_4$. The results are indicated in Table 1.

EXAMPLE 5

Example 3 was repeated, feeding to the reactor a liquid mixture consisting of 77% of methanol, 20% of MTBE and 3% of water and containing 6 ppm of HBr and 200 ppm of $H_2SO_4$. The results are indicated in Table 1.

EXAMPLE 6

Example 3 was repeated, feeding to the reactor a liquid mixture consisting of 47% of methanol, 50% of MTBE and 3% of water and containing 6 ppm of HBr and 200 ppm of $H_2SO_4$. The results are indicated in Table 1.

EXAMPLE 7

Example 3 was repeated, feeding to the reactor a liquid mixture consisting of 27% of methanol, 70% of MTBE and 3% of water and containing 6 ppm of HBr and 200 ppm of $H_2SO_4$.

The results are indicated in Table 1.

EXAMPLE 8

Example 3 was repeated, feeding to the reactor a liquid mixture consisting of 17% of methanol, 80% of MTBE and 3% of water and containing 6 ppm of HBr and 200 ppm of $H_2SO_4$.

The results are indicated in Table 1.

TABLE 1

| Ex. Nr. | Reaction hours | MTBE % | $H_2O_2$ wt % | $H_2O_2$ Selectivity molar % |
|---|---|---|---|---|
| 3 | 50 | 0 | 5.6 | 74 |
| 4 | 50 | 5 | 5.4 | 77 |
| 5 | 50 | 20 | 5.5 | 80 |
| 6 | 50 | 50 | 5.5 | 82 |
| 7 | 50 | 70 | 5.7 | 78 |
| 8 | 50 | 80 | 5.2 | 75 |

EXAMPLE 9

Example 3 was repeated, feeding to the reactor a mixture consisting of:

42% Methanol, 50% MTBE, 5% cyclohexane, 3% water and containing 6 ppm of HBr and 200 ppm of $H_2SO_4$.

After 50 hours of reaction, 5.7% of $H_2O_2$ are obtained with a selectivity of 85%.

The invention claimed is:

1. A process for the production of hydrogen peroxide from hydrogen and oxygen in a reaction solvent containing a halogenated promoter and/or an acid promoter, in the presence of a heterogeneous catalyst based on one or more metals of the platinum group as active components, wherein the reaction solvent comprises:
    (1) an alcohol or mixture of alcohols; and
    (2) MTBE;
    the alcohol being selected from the group consisting of those having from 1 to 6 carbon atoms,
    wherein the MTBE is present in an amount of 5 to 80% by weight of the reaction solvent.

2. The process according to claim 1, wherein the alcohol is selected from the group consisting of those having from 1 to 4 carbon atoms.

3. The process according to claim 2, wherein the alcohol is selected from the group consisting of methanol, ethanol, terbutanol (TBA) and their mixtures.

4. The process according to claim 3, wherein the alcohol is methanol.

5. The process according to claim 1, wherein the quantity of alcohol or mixture of alcohols ranges from 10 to 95% by weight with respect to the reaction solvent.

6. The process according to claim 5, wherein the quantity of alcohol or mixture of alcohols ranges from 20 to 80% by weight with respect to the reaction solvent.

7. The process according to claim 1, wherein the quantity of MTBE having general formula (I) ranges from 20 to 80% by weight with respect to the reaction solvent.

8. The process according to claim 1, which additionally comprises water in an amount of from 0 to 50% by weight with respect to the reaction solvent.

9. The process according to claim 8, wherein the quantity of water ranges from 2 to 30% by weight with respect to the reaction solvent.

10. The process according to claim 1, wherein the reaction solvent additionally comprises one or more $C_5$–$C_{32}$ hydrocarbons selected from the group consisting of paraffins, cyclo-paraffins and aromatic hydrocarbons.

11. The process according to claim 10, wherein the paraffins are present, and are linear or branched.

12. The process according to claim 10, wherein the paraffins are present, and are selected from the group consisting of those having from 5 to 18 carbon atoms.

13. The process according to claim 10, wherein the paraffins are present, and are selected from the group consisting of n-hexane, n-heptane, n-octane, n-decane and their branched isomers.

14. The process according to claim 10, wherein the cyclo-paraffins are present, and are selected from the group consisting of cyclohexane, decaline and their derivatives substituted with one or more alkyl groups having from 1 to 6 carbon atoms.

15. The process according to claim 14, wherein the substituted cyclo-paraffins are present, and are selected from the group consisting of methyl cyclohexane, ethyl-cyclohexane and dimethyl-cyclohexane.

16. The process according to claim 10, wherein the aromatic hydrocarbons are present, and are selected from the group consisting of those having from 6 to 24 carbon atoms.

17. The process according to claim 16, wherein the aromatic hydrocarbons are selected from the group consisting of benzene, naphthalene, alkylbenzenes and alkylnaphthalenes with one or more linear or branched alkyl chains having from 1 to 18 carbon atoms.

18. The process according to claim 17, wherein the alkylbenzenes or alkylnaphthalenes are present, and have a linear or branched alkyl chain having from 6 to 12 carbon atoms.

19. The process according to claim 18, wherein the alkylbenzenes are present, and are selected from the group consisting of toluene, xylenes (ortho, meta and para), ethylbenzene and cumene.

20. The process according to claim 10, wherein the quantity of hydrocarbons ranges from 0 to 40% by weight with respect to the reaction solvent.

21. The process according to claim 20, wherein the quantity of hydrocarbons ranges from 0.1 to 20% by weight with respect to the reaction solvent.

22. The process according to claim 1, wherein the metal components of the catalyst are at least one selected from the group consisting of palladium, platinum, ruthenium, rhodium, iridium and gold.

23. The process according to claim 22, wherein the metal components of the catalyst are palladium and platinum.

24. The process according to claim 23, wherein the catalyst contains a quantity of palladium ranging from 0.01 to 5% by weight and a quantity of platinum ranging from 0.01 to 1% by weight, with an atomic ratio platinum/palladium ranging from 0.1/99.9 to 50/50.

25. The process according to claim 24, wherein the catalyst contains a quantity of palladium ranging from 0.2 to 3% by weight and a quantity of platinum ranging from 0.02 to 0.5% by weight, with an atomic ratio platinum/palladium ranging from 1/99 to 30/70.

26. The process according to claim 1, wherein the catalyst is prepared by dispersing the active components on an inert carrier by means of precipitation and/or impregnation.

27. The process according to claim 25, wherein the catalyst comprises at least two metals, and is prepared by dispersing in sequence and alternating the precursors of the single metal components of the catalyst on a carrier.

28. The process according to claim 25, wherein the carrier is selected from the group consisting of activated carbon, activated carbon functionalized with sulfonic groups, silica, alumina, silica-alumina and zeolites.

29. The process according to claim 28, wherein the carrier is an activated carbon with a surface area higher than 100 $m^2/g$.

30. The process according to claim 29, wherein the activated carbon has a surface area higher than 300 $m^2/g$.

31. The process according to claim 30, wherein the activated carbon has a surface area higher than 600 $m^2/g$.

32. The process according to claim 1, wherein the catalyst is used at a concentration ranging from 0.1 to 10% by weight with respect to the reaction solvent.

33. The process according to claim 32, wherein the catalyst is used at a concentration ranging from 0.3 to 3% by weight with respect to the reaction solvent.

34. The process according to claim 1, wherein the acid promoter is present, and is selected from the group consisting of substances capable of generating $H^+$ hydrogen ions in the reaction solvent.

35. The process according to claim 34, wherein the acid promoter is selected from the group consisting of inorganic acids and organic acids.

36. The process according to claim 35, wherein the acid promoter is sulfuric acid or phosphoric acid.

37. The process according to claim 1, wherein the concentration of acid promoter ranges from 20 to 1000 mg per kg of reaction solvent.

38. The process according to claim 37, wherein the concentration of acid promoter ranges from 50 to 500 mg per kg of reaction solvent.

39. The process according to claim 1, wherein the halogenated promoter is present, and is selected from the group consisting of substances capable of generating halogen ions in the reaction solvent.

40. The process according to claim 39, wherein the halogenated promoter is selected from the group consisting of compounds capable of generating bromide ions.

41. The process according to claim 40, wherein the compound is hydrobromic acid, sodium bromide or potassium bromide.

42. The process according to claim 1, wherein the concentration of halogenated promoter ranges from 0.1 to 50 mg per kg of reaction solvent.

43. The process according to claim 42, wherein the concentration of halogenated promoter ranges from 1 to 10 mg per kg of reaction solvent.

44. The process according to claim 1, wherein the reaction is carried out at a temperature ranging from −5 to 90° C.

45. The process according to claim 44, wherein the temperature ranges from 2 to 50° C.

46. The process according to claim 1, wherein the reaction is carried out at a total pressure higher than atmospheric pressure.

47. The process according to claim 46, wherein the total pressure ranges from 30 to 300 bars.

48. The process according to claim 1, wherein the molar ratio hydrogen/oxygen in the feeding ranges from 1/1 to 1/100.

49. The process according to claim 48, wherein the molar ratio hydrogen/oxygen in the feeding ranges from 1/2 to 1/15.

50. The process according to claim 1, wherein the reaction is carried out in the presence of an inert gas selected from the group consisting of nitrogen, helium, and argon.

51. The process according to claim 50, wherein the inert gas is nitrogen.

52. The process according to claim 1, wherein the concentration of hydrogen in the gaseous phase in contact with the reaction solvent is maintained at a value lower than 4.5% molar.

53. The process according to claim 1, wherein the reaction is carried out using air as oxygen source.

54. The process according to claim 1, wherein the reaction is carried out batchwise or in continuous.

55. The process according to claim 1, wherein the solution of hydrogen peroxide is used directly in an oxidation process of a substrate selected from the group consisting of olefins, aromatic hydrocarbons, ammonia and carbonyl compounds, using titanium silicalite as catalyst.

56. The process according to claim 35, wherein the acid promoter is sulfuric, phosphoric or nitric acid.

57. The process according to claim 35, wherein the acid promoter is a sulfonic acid.

58. The process according to claim 40, wherein the compound is ammonium bromide or sodium bromate.

59. The process according to claim 1, wherein the alcohol is methanol, and wherein the methanol is present in an amount of 17 to 92% by weight of the reaction solvent.

60. The process according to claim 1, wherein the hydrogen peroxide produced has a selectivity greater than the hydrogen peroxide produced in an identical process using a reaction solvent comprising an alcohol or mixture of alcohols having from 1 to 6 carbon atoms but excluding MTBE.

* * * * *